Dec. 18, 1956  R. O. JACKSON  2,774,603
TOOL SHANK AND HOLDBACK KEYWAY CONSTRUCTION
Filed Feb. 4, 1954
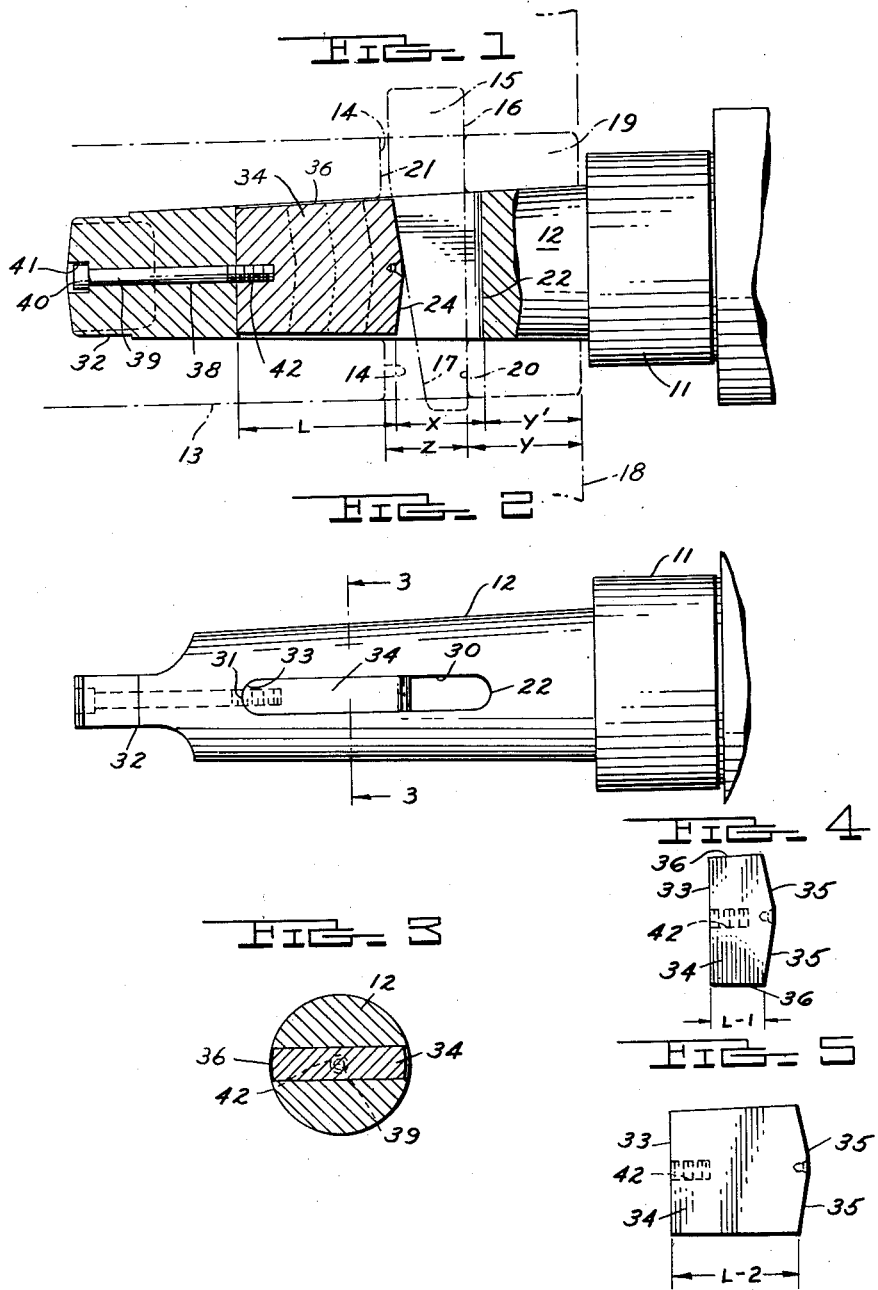
INVENTOR.
ROBERT O. JACKSON
BY
Farley, Forster & Farley
ATTORNEYS United States Patent Office
2,774,603
Patented Dec. 18, 1956

2,774,603

TOOL SHANK AND HOLDBACK KEYWAY CONSTRUCTION

Robert O. Jackson, St. Clair Shores, Mich., assignor to Beaver Tool and Engineering Corporation, Royal Oak, Mich., a corporation of Michigan Application February 4, 1954, Serial No. 408,278

8 Claims. (Cl. 279—97)

This invention relates to an improved construction for the shank of a tool or tool holder in order to provide a variable relation between the location of the keeper or holdback keyways formed in such shank and in the spindle of a machine tool in which such shank is inserted.

Conventionally, a taper shank tool or tool holder is held in a correspondingly internally tapered spindle of a machine by a keeper or holdback key inserted through one of a pair of diametrically opposed keyways in the spindle and into a keyway in the shank of the tool. The keeper key has a flat edge which usually engages the end of the spindle keyway adjacent the face of the machine, and a tapered edge which engages a correspondingly tapered surface provided in the end of the tool keyway toward the tang end of the tool, so that the keeper key draws the shank of the tool inwardly into firm seated engagement with the spindle. The location of the tool keyway along the shank of the tool must have a certain correspondence with the location of the spindle keyway from the end of the spindle.

Standards for the various dimensions of spindle and tool keyways have only recently been established and still are not uniformly followed by machine tool builders. In many existing machines the distance from the end or face of the spindle to the adacent end of the holdback keyway formed therein may vary among makes, types and models of machines. Tool manufacturers have consequently been unable to standardize the dimensions of tool keyways and have been forced to carry a large inventory of a tool of any particular type, with different models differing only in the dimensioning of the holdback keyway in the tool shank. Users of machines having different holdback keyway dimensions in the spindles of their machines have to stock larger numbers of tools, and have to be particularly careful in ordering to make sure that the tool model ordered corresponds to the characteristics of the spindle with which it is to be used.

The present invention provides a new construction for the holdback keyway of a tool shank, the word "tool" being used to denote either tools or tool holders of the taper shank type. This construction permits the tool shank to be standardized, so that one tool can be used in any of the different spindles of that size by the use of a suitable adapter which establishes the working dimension of the tool shank keyway to correspond to the working dimension of the spindle keyway.

According to the invention, the tool shank is formed with a transverse slot extending along its longitudinal centerline a distance considerably greater than the length of a holdback keyway, and ending short of the tang end of the tool. This tang end of the slot forms its working face. A series of insert members are provided, each having one end formed to engage the working face of the slot and its other end formed to provide a wedge surface for engagement by a holdback key. The length of each insert member in the series is different, so that any one of the inserts can be selected and assembled in the slot to provide a keyway having a key-engaging face located at the proper distance from the base of the shank of the tool. Means are provided for securely engaging any one of the inserts in the slot against the working face thereof, and preferably each insert in the series is formed with its edges curved to correspond to the tapered diameter of the shank, but with the width of any insert slightly less than the diameter of the shank along the edges of the insert.

A presently preferred embodiment of the invention is disclosed in the accompanying drawing which comprises the following views:

Fig. 1 is a sectional elevation taken through the longitudinal centerline of a tool shank, in the plane of the holdback keyway thereof. The end of a machine tool spindle and holdback key are shown in phantom in this view to show the working relationship of the construction with a machine tool;

Fig. 2 is a plan view of a tool shank;

Fig. 3 is a cross-sectional view taken along the line 3—3 of Fig. 2; and

Figs. 4 and 5 are side elevations of two of the many possible alternate sizes of keyway insert members that can be used with the improved tool shank construction.

Referring to Fig. 1, a tool or tool holder 11, of any conventional type, is provided with the usual taper shank 12, and is shown inserted within a spindle 13 having a corresponding internal taper. A pair of diametrically opposite keyways 14 are formed through the walls of the spindle, and a holdback key 15 is adapted to be inserted through either of the slots 14 into engagement with a cooperating keyway formed in the shank 12 of the tool. The holdback key 15 shown is conventional in shape and has a straight edge 16 and a tapered ege 17.

Standard practice is to establish all keyway dimensions from a gage line 18 in the plane of the nose 19 of the spindle; and, in order for a tool shank to be properly held in the spindle by the key 15, the holdback keyways of both the spindle and the shank must bear a certain relation to the gage line 18 and to each other. Standards have been recently established for these dimensions for each taper shank size number; but, as previously mentioned, this has not alleviated the problem of matching a tool shank with a particular spindle.

Spindle keyways are dimensioned by the distance from the gage line 18 to the front 20 of the keyway, as indicated by the dimension "Y" and by the length of the keyway as indicated by the dimension "Z" between the front face 20 and rear face 21 thereof.

Shank keyways are dimensioned by the distance Y' from the gage line 18 to the bottom 22 of the keyway, and by the length of the keyway as indicated by the dimension X. In standard practice the dimension Y for the spindle keyway always exceeds the dimension Y' for the shank keyway, and the length Z of the spindle keyway always is in excess of the length X of the shank keyway.

The shank keyway is formed with a tapered working face 24 corresponding to the tapered face 17 of the key 15. The difference in dimensioning outlined above is provided so that the straight edge 16 of the key will engage the front face 20 of the spindle keyway, and the tapered edge 17 of the key will always engage the tapered working face 24 of the shank keyway, with clearance between the straight edge 16 of the key and bottom 22 of the shank keyway and between the tapered edge 17 and rear end 21 of the spindle keyway. When the key is forced into engagement with the keyways, the shank will always be drawn into firm engagement with the spindle if this difference in dimensioning is maintained. No contact is desired between the straight face 16 of the key and the bottom 22 of the shank keyway or between the tapered face of the key and the rear end 21 of the spindle keyway.

The invention provides a standard construction for the tool shank and its keyway which permits the same shank to be used with any spindle of the same taper, regardless of variations in the dimensions Y and Z between any two such spindles. A transverse slot 30 is formed through the longitudinal centerline of the shank 12. The end of this slot adjacent the gage line 18 forms the bottom 22 of the shank keyway and is spaced from the gage line a distance Y' less than the smallest of any distance Y of any spindle with which the tool is to be used. The opposite end 31 of the slot 30 is extended toward the tang 32 of the shank and will be referred to as the tang end of the slot. This tang end 31 forms the locating surface of the slot and establishes the longitudinal position of any one of a series of insert members 34.

Each insert member 34 has a thickness slightly less than the width of the slot 30, and has a base end 33 formed for seating engagement with the tang end 31 of the slot 30. The opposite, or working, end of each insert member is provided with a pair of tapered faces 35, either of which act as the working face of the shank keyway when engaged by the tapered face 17 of a key. The side edges 36 of each insert 34 are tapered to correspond to the taper of the particular shank 12 with which it is to be used; and, as can be seen in Figs. 1 and 3, the width of each insert, or its dimension across the diameter of the shank, is slightly less than the shank diameter along the entire length of the insert to provide a normal condition where the edges of the insert are depressed within the circumference of the shank 12. These edges 36 have an outer curvature corresponding to the curvature of the shank circumference.

A hole 38 is drilled along the longitudinal centerline of the shank inwardly from the tang end 32 thereof and receives a cap screw 39 with the head 40 of the screw being recessed within a counterbore 41. A hole 42 is drilled and tapped in the base end 33 of each insert so that any insert of a series designed for a particular taper shank may be positioned within the slot 30 thereof, engaged by the screw 39, and the base end 33 of the insert thereby drawn tightly against the tang end 31 of the slot 30.

Any insert member 34 of a series is designated by a dimension L, denoting the length between the base 33 and working faces 35 thereof. For any series of inserts, the dimension L of each insert of the series will be graduated in suitable increments so that the proper insert can be selected to establish the working face of the shank keyway at a lesser distance from the gage line 18 than is the rear face 21 of the spindle keyway of the particular spindle with which the tool is to be used. This is indicated by the dimensions L—1 and L—2 of the inserts of Figs. 4 and 5, respectively.

When such an insert has been selected and installed in the tool shank, the tool can be inserted in the spindle and locked in position by a holdback key in the conventional manner. Any lateral deflection of the insert in the tool shank resulting from the engagement between the tapered face 17 of the holdback key and a working face 35 of the insert will not damage the internal bore of the spindle due to the reduced width of the insert and the curvature provided on the edges 36 thereof. This curvature corresponds to that of the spindle bore so that, if an insert is deflected laterally the amount of the clearance, it will merely be seated against the spindle.

The specific construction disclosed is representative only and constitutes a presently preferred example of the invention. Such modifications to the construction as are included in the scope of the following claims are to be considered part of the invention.

I claim:

1. A holdback keyway construction for a tool having a taper shank, comprising a slot formed transversely through the longitudinal center line of said shank, said slot being dimensioned to form the sides and bottom end of said keyway and a locating surface, and an insert member having a thickness suitable for insertion in said slot and a width not exceeding the diameter of said shank, one end of said insert member being shaped to provide a working face for said keyway and the other end formed to engage the said locating surface of said slot, the length of said insert member being dimensioned to establish the desired length for the holdback keyway formed in said tool shank between the bottom end of said slot and the said working face of said insert member, and means for detachably securing said insert member in said slot whereby the length of said keyway may be varied as a function of the length of said insert member.

2. A holdback keyway construction according to claim 1 wherein the means for securing said insert member in said slot comprises a fastening element extending inwardly from the tang end of said tool shank substantially along the longitudinal centerline thereof and threadedly engaging said insert to draw the same into firm engagement with the locating surface of said slot.

3. A holdback keyway construction according to claim 1 further characterized by the side edges of said insert being formed with a taper corresponding to the taper of said shank and a curvature corresponding to the curvature of the surface of said shank adjacent each insert when in assembled relation with said shank.

4. A holdback keyway construction according to claim 3 further characterized by said insert having a width less than the diameter of said tool shank at all points along the length of said insert.

5. A tool shank construction comprising a transverse slot formed in said shank, said slot being dimensioned to provide the bottom end and sides of a holdback keyway, an insert member formed to a thickness less than said slot for insertion therein, said insert member having a base and formed for engagement with the end of said slot adjacent the tang end of said tool shank, and a working end formed for engagement by a keeper key, the length of said insert member being less than the length of said slot, and means for detachably securing said insert member to said tool shank whereby the length of said holdback keyway is defined by the length of said insert member.

6. A tool shank construction comprising a transverse slot formed in said shank through the longitudinal centerline thereof, one end of said slot being dimensioned from the gage line of said tool shank to form the bottom end of a holdback keyway and the opposite end of said slot being extended toward the tang end of said tool shank a distance in excess of the length of said holdback keyway, said excess portion of said slot being provided to receive an insert member, said insert member having one end thereof shaped to form the working face of said holdback keyway, and means carried by said shank for detachably securing said insert member in said slot whereby the length of said holdback keyway is defined by the length of said insert member.

7. A tool shank construction according to claim 6 wherein said means for securing said insert member comprises a hole formed longitudinally of said shank between the tang end thereof and the end of said slot adjacent thereto, and a fastening element insertable in said hole and having a threaded end for engaging said insert member.

8. An insert member for use with a tool shank provided with a transverse slot along the longitudinal centerline thereof to form the sides and bottom end of a holdback keyway, said insert member having a thickness less than the width of said slot for insertion therein, said insert member having a base end formed for engagement with a locating surface of said slot and a working end formed for engagement by a holdback key, the length of said insert member being less than the length of said slot, and means provided in the body of said insert member whereby said insert member can be detachably secured to said tool shank within the slot thereof whereby the length of said holdback keyway is defined by the length of said insert member.

References Cited in the file of this patent

UNITED STATES PATENTS

| | | |
|---|---|---|
| 329,545 | Foley | Nov. 3, 1885 |
| 1,132,375 | Myers | Mar. 16, 1915 |
| 2,509,990 | Schauer | May 30, 1950 |

FOREIGN PATENTS

| | | |
|---|---|---|
| 137,369 | Germany | Dec. 20, 1902 |